3,370,518
PHOTOGRAPHIC COMPOSING APPARATUS
Karl-Jürgen Debus, Bad Homburg vor der Hohe, Germany, assignor to Linotype G.m.b.H., Frankfurt am Main, Germany
Filed June 22, 1965, Ser. No. 465,884
Claims priority, application Germany, June 24, 1964, L 48,111
1 Claim. (Cl. 95—4.5)

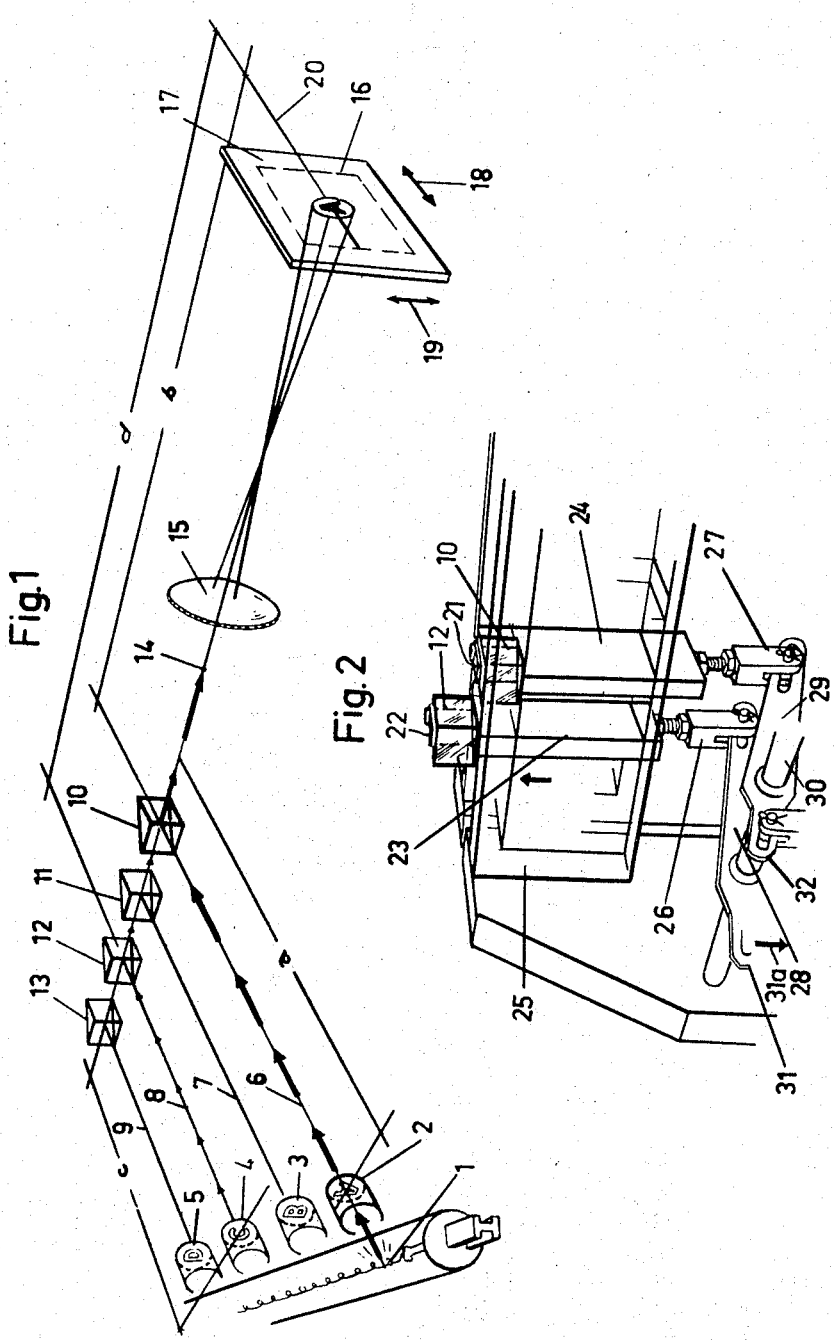

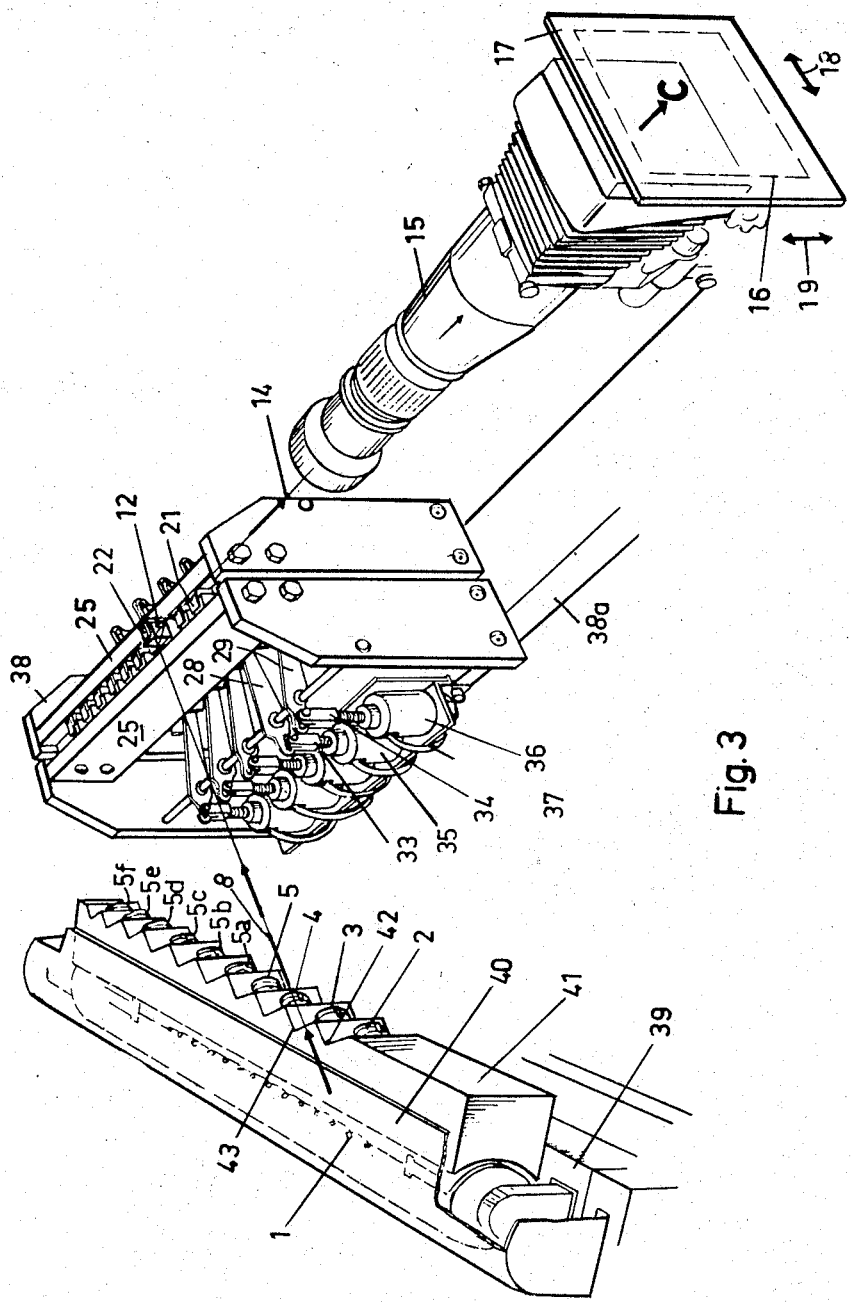

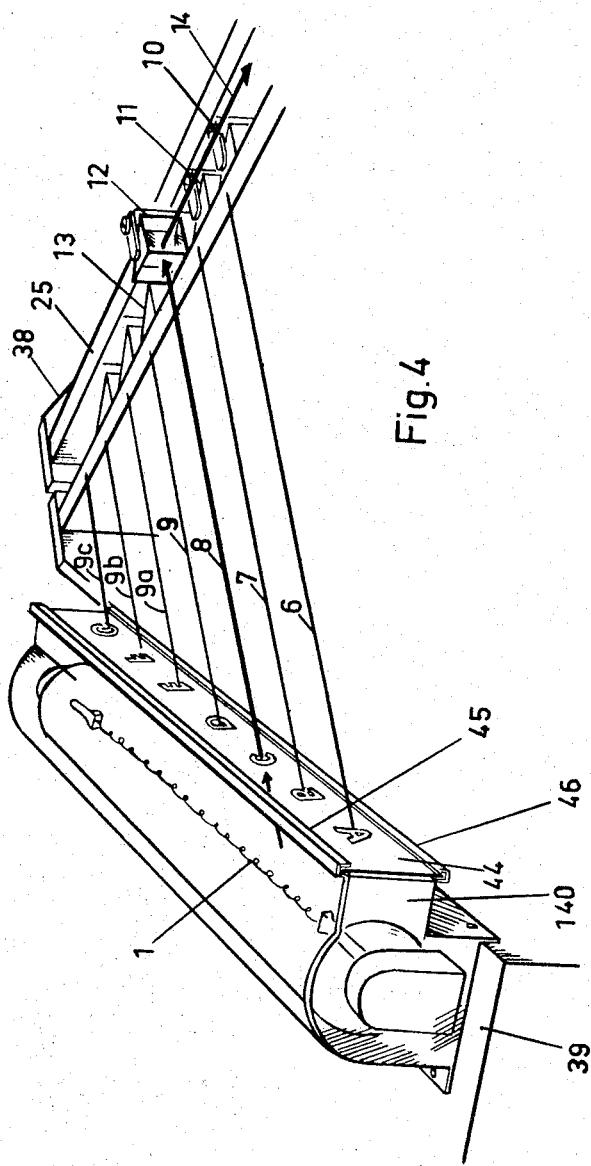

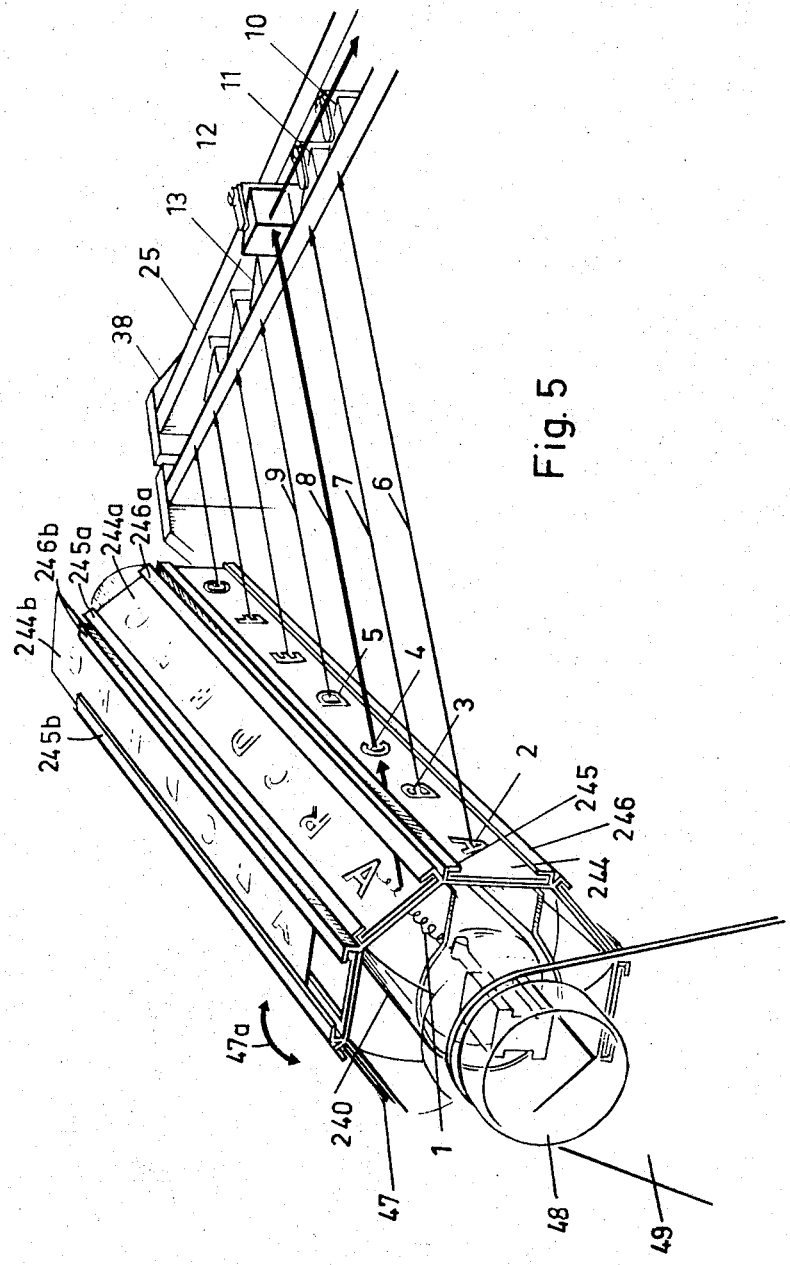

ABSTRACT OF THE DISCLOSURE

Light rays project the images of transparencies in a plurality of paths. A prism or mirror is provided for each transparency and one selected prism can be placed in the respective path for deflecting the light rays through a lens onto a photosensitive surface, while all other prisms are held outside of the respective paths.

---

The present invention relates to photographic composing apparatus of the type wherein light issuing from a source and passing through a transparency is directed against a photosensitive surface.

In heretofore known photographic composing apparatus, such transparencies are assembled or provided on a square supporting panel which carries intersecting horizontal and vertical rows of transparencies. The selection of transparencies is effected by means of a shutter which comprises several relatively movable blades and which can define an opening for the passage of light rays through a system of lenses and along the optical axis to impinge upon the photosensitive plate or sheet on which the consecutively projected images form a line or a series of lines. The photosensitive material is transported in a direction at right angles to the lines and the advance in the longitudinal direction of lines takes place by means of a prism which moves continuously toward the end of the respective line.

Photographic composing apparatus of the above outlined type are very bulky, complicated and expensive, especially since a relatively large panel of transparencies must be replaced by a different panel whenever the user wishes to project an image which is not present on that panel which happens to be inserted into the apparatus.

Accordingly, it is an important object of my invention to provide a greatly simplified, exceptionally compact and easy-to-manipulate photographic composing apparatus wherein the transparencies occupy very little room, wherein such transparencies may be rapidly and conveniently replaced or reinserted, wherein all of the transparencies need not be removed if a single transparency or a single set of transparencies requires removal or replacement, and which may be operated in a fully automatic way.

Another object of my invention is to provide a novel system of deflectors and a novel selector assembly for such deflectors enabling the improved composing apparatus to rapidly project any of a series of images onto a photosensitive surface.

A further object of the invention is to provide a novel carrier for one or more rows or groups of transparencies and to construct and assemble the carrier in such a way that the transparencies may be removed or inserted either individually or in groups of two or more.

An additional object of the invention is to provide a photographic composing apparatus of the above outlined characteristics wherein each of a series of images may be projected with equal sharpness, in the same proportion as regards its size, and in rapid sequence so that such serially projected images may form on the photosensitive material one or more lines of images within very short periods of time.

A concomitant object of the invention is to provide a photographic composing apparatus wherein, on its way to the photosensitive surface, a light ray or a bundle of light rays passing through any one of a series of transparencies must cover exactly the same distance.

Still another object of the instant invention is to provide a composing apparatus wherein the selection of images may be carried out in a fully automatic way and wherein a single light source suffices to project any one of a series of images at the will of the operator.

Briefly stated, one feature of my invention resides in the provision of a photographic composing apparatus which comprises at least one carrier supporting a single row of diapositives, dianegatives or similar transparencies, a light source located behind the carrier so that light rays issuing from the source and passing through the respective transparencies project the images of such transparencies in predetermined paths which are preferably located in a common plane, an intelligence storing body (e.g., a sheet or roll of photographic film) having an image-receiving surface and being movable in the plane of such surface, a zoom lens or other suitable focussing means for focussing onto the surface of the intelligence storing body one image at a time, and a series of prisms, mirrors or analogous optical deflecting means for selectively deflecting light rays passing through the transparencies from the respective paths and into the optical axis of the focussing means. The length of each deflected light ray between the respective transparency (i.e., between the optical center of the respective transparency) and the image-receiving surface of the intelligence storing body is the same.

The carrier may take the form of a flat slide or it may be shaped as a stepped body each step of which detachably and adjustably supports a separate housing for a single transparency. Two or more slides may be mounted on a drum which surrounds and is rotatable about the light source, or a series of such carriers may be mounted in a common plane and the carriers may be moved in the common plane in order to place a selected carrier in front of the light source.

The deflecting means preferably includes a series of prisms which are movable independently of each other and each of which preferably deflects the respective image when it is caused to move to an upper end position.

The novel features which are considered as characteristic of the invention are set forth in particular in the appended claims. The improved photographic composing apparatus itself, however, both as to its construction and the mode of operating the same, together with additional features and advantages thereof, will be best understood upon perusal of the following detailed description of certain specific embodiments with reference to the accompanying drawings, in which:

FIG. 1 is a diagrammatic perspective view showing a portion of a photographic composing apparatus which embodies one form of my invention;

FIG. 2 is a fragmentary perspective view of the structure which moves the deflecting elements of the composing apparatus to and from their operative positions;

FIG. 3 is a perspective view of the fully assembled composing apparatus wherein the transparencies are staggered with reference to each other;

FIG. 4 is a fragmentary perspective view of a modified composing apparatus wherein the transparencies are carried by a plate-like carrier which resembles a slide;

Figure 6:
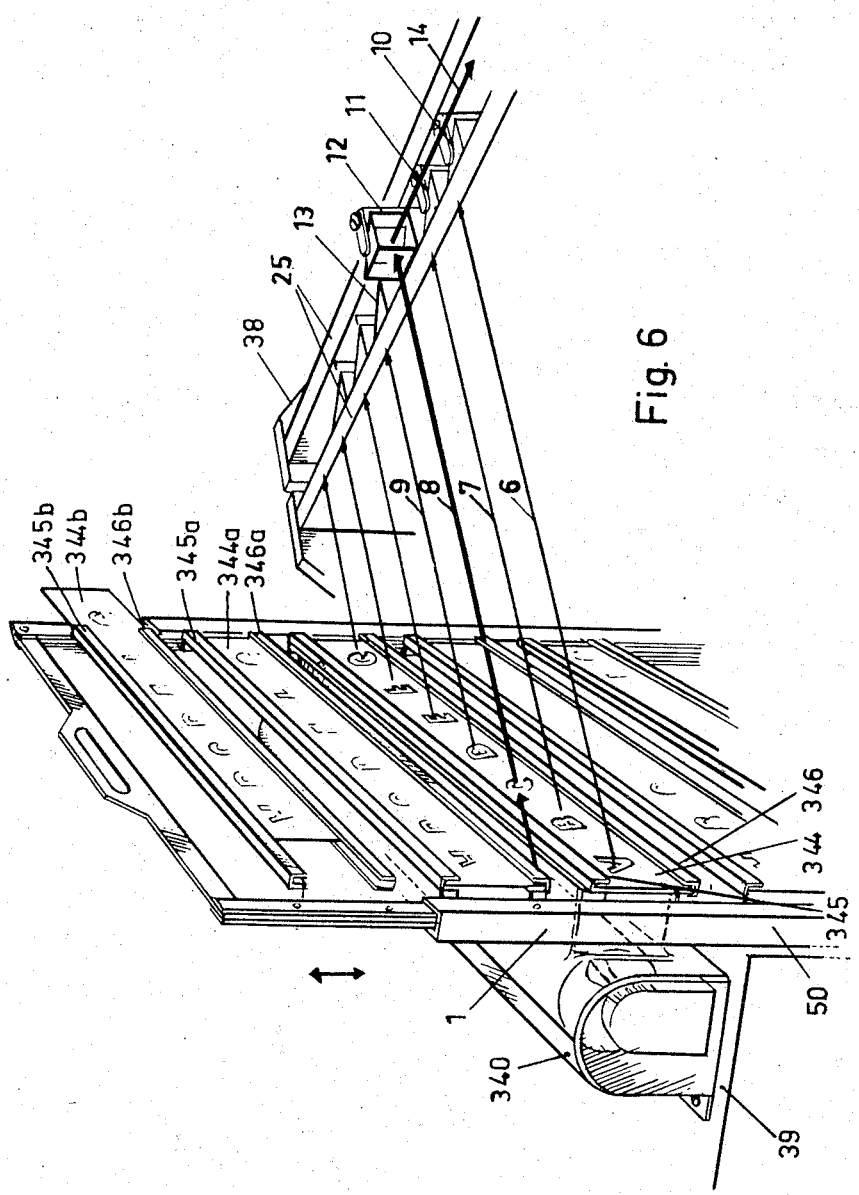

FIG. 5 is a similar fragmentary perspective view of a third composing apparatus wherein the light source is surrounded by a rotary drum which is arranged to support a series of mutually inclined plate-like slides; and FIG. 6 is a fragmentary perspective view of a fourth composing apparatus wherein two or more coplanar slides are movable up or down in a fixed board located in front of the light source.

Referring first to FIG. 1, there is shown a photographic composing apparatus which comprises a rod-shaped or pencil-shaped light source 1 serving to direct light rays or bundles of light rays through a series of transparencies A, B, C and D respectively mounted in housings 2, 3, 4 and 5. Each of these transparencies may constitute a diapositive or a dianegative. The light rays 6, 7, 8 and 9 which respectively pass through the transparencies A, B, C and D are disposed in a common plane, and such light rays may be deflected by the corresponding deflecting elements here shown as prisms 10, 11, 12 and 13. If desired, the prisms 10–13 may be replaced by suitable mirrors. Though the drawing shows all of the prisms 10–13 in their operative positions, it is clear that only one at a time will be moved to such position so that the respective light ray 6, 7, 8 or 9 is deflected into the optical axis 14 and travels through a system of focussing lenses 15 which project the image onto the light-sensitive surface of an intelligence storing body here shown as a film 16 mounted in a frame 17.

In FIG. 1, the foremost prism 10 is shown by heavy lines to indicate that it is located in operative position so that the image on the foremost transparency A is projected onto the film 16. For the same reason, the housing 2 for the transparency A and the light ray 6 which passes through the transparency A and is deflected by the prism 10 are illustrated by heavy lines resp. arrows.

Each of the prisms 10–13 is reciprocable up and down in a vertical plane at right angles to the optical axis 14 and extends into the path of the light ray 6, 7, 8 or 9 when it assumes its upper end position. Such reciprocation of prisms 10–13 is preferably brought about by remote control and in a manner to be explained in connection with FIG. 3. The film frame 17 is movable in directions indicated by double-headed arrows 18 and 19.

In accordance with a feature of my invention, the distance 20 which any one of the light rays 6, 7, 8 or 9 must cover from the respective housing 2, 3, 4 or 5 to the plane of the film 16 is the same. Thus, the distance 20 covered by the light ray 6 equals the combined length of a distance $a$ between the optical center of the transparency A and the optical axis 14 plus the distance $b$ from the point of deflection on the prism 10 to the plane of the film 16. The distance covered by the light ray 8 equals the distance $c$ from the optical center of the transparency C to the optical axis 14 plus the distance $d$ from the point of deflection on the prism 12 to the plane of the film 16. It will be seen that the distance $d$ exceeds the distance $b$ and that the distance $a$ exceeds the distance $c$. In other words, the axis of the light source 1 is inclined with reference to the optical axis 14. This insures that the image of each transparency on the film 16 is equally sharp and that the relative size of each such image is the same as the relative sizes of images on the transparencies A to D.

The film frame 17 may be replaced by a cartridge, plate or magazine and this frame is shifted, either vertically or horizontally, subsequent to transmission of each consecutive image and always by a distance corresponding to the width or height of an image. In the embodiment of FIG. 1, the frame 17 is about to move in a direction to the right (as indicated by the right-hand head of the arrow 18), i.e., in a direction counter to that in which a line of images is to be formed. The left-hand head of the arrow 18 indicates the direction in which the frame 17 moves back to the beginning of the respective line. In order to produce the next line of images, the frame 17 will move upwardly (as indicated by the upper head of the arrow 19), and the lower head of the arrow 19 indicates the direction of return movement of the film 16 in order to bring a preceding line of images into a common plane with the optical axis 14.

The composing apparatus of FIG. 1 is operated as follows:

If the user wishes to reproduce the image of the transparency A, the prism 10 is moved upwardly to the position shown by heavy lines so that it deflects the light ray 6 into the optical axis 14. The lens system 15 focusses the image on the film 16. The upward movement of the prism 10 may be effected by hand, for example, by means of a suitable keyboard (not shown), or by resorting to perforated tape in a manner well known from the art of conventional composing apparatus.

When the corresponding portion of the film 16 is exposed, the prism 10 is caused to return to its lower end position and the frame 17 is automatically advanced by a distance (arrow 18) corresponding to the width of an image so that an unexposed portion of the film 16 is ready to receive the next image. Of course, the film frame 17 may be advanced in response to movement of the next prism to its operative (upper end) position.

FIG. 2 illustrates the mounting of the prisms 10, 12 which are respectively shown in their lower and upper end positions. These prisms are respectively mounted at the upper ends of elongated block-shaped holders or plungers 24, 23 which are reciprocable in the space between two elongated strip-shaped horizontal guide members 25. The connections between the prisms 10, 12 and the respective holders 24, 23 are of the adjustable type and may include suitable clamping brackets 21, 22. These brackets allow for angular adjustment of the prisms 10, 12 about vertical axes which are normal to the optical axis 14. The lower ends of the holders 24, 23 are provided with bifurcated coupling elements 27, 26 which are articulately connected with the longer arms of two-armed motion transmitting levers 29, 28, each of these levers being turnable about the axis of a common supporting shaft 30. The shorter arms 32, 31 of the levers 29, 28 are rockable by means of electromagnets 36, 35 which are shown in FIG. 3. The arrow 31a in FIG. 2 indicates the direction in which the shorter arm 31 of the lever 28 for the holder 23 was rocked in order to move the prism 12 to the upper end position.

Referring now to FIG. 3, the connections between the shorter arms 32, 31 of the levers 29, 28 and the movable armatures of the electromagnets 36, 35 for the prisms 10, 12 comprise bifurcated coupling elements 34, 33. The electromagnets 36, 35 are connected with the impulse generating or control assembly which completes the respective circuits 37 in response to depression of a selected key or by resorting to a perforated tape.

The electromagnets are disposed in two parallel rows which are preferably mirror symmetrical with reference to the common plane of the holders 23, 24. The electromagnets for the prisms 10, 12, etc. are disposed at one side of such plane and the electromagnets (not shown) for the prisms 11, 13, etc. are located at the other side of the same plane. The casing 38 for the electromagnets also supports the aforementioned guide members 25 for the holders 23, 24 and for the holders of all other prisms. The casing 38 forms a unitary structure which may be adjustably secured to a platform 38a.

FIG. 3 shows further that the light source 1 is mounted on a base 39 and that a portion thereof is surrounded by a reflector or shield 40 so that the light rays are directed toward the transparencies in the housings 2, 3, 4, 5, 5a–5f. The base 39 also supports a suitably configurated carrier 41 which accommodates the housings 2–5f. It will be noted that the carrier 41 is stepped so that the planes of the transparencies in the housings 2–5f are parallel to each other and make the same acute angle with the axis of the light source 1. The first two steps 42, 43 of the carrier 41 respectively support the housings 2 and 3 for the transparencies A and B. Each of the housings 2–5a is detachable and each such housing is also adjustable with the reference to the carrier 41 in the direction in which the light rays passing through the respective transparencies advance toward the associated prism in the casing 38. A very important advantage of the carrier 41 is that it can support original transparencies.

FIG. 3 shows the composing apparatus in actual use when the electromagnet 35 is energized so that its armature pulls the shorter arm 31 of the lever 28 downwardly (arrow 31a in FIG. 2) whereby the prism 12 is raised to its upper end position and deflects the light ray 8 into the optical axis 14. The lens assembly 15 may be moved in the longitudinal direction of the optical axis 14 so as to enlarge or reduce the size of the image (C) on the film 16, i.e., the lens assembly is preferably of the type known as a zoom lens. In addition, such mounting of the assembly 15 enables the operator to bring the image on the film 16 into sharp focus. The structure including the lens assembly 15 and the film frame 17 forms part of a photographic camera which (or whose frame 17) is movable in directions indicated by the arrows 18 and 19.

Since the mass of the prisms shown in FIG. 3 is relatively small, such prisms may be rapidly moved into and out of the path of the respective light rays, and the selector means (including the electromagnets and a manually operated keyboard or perforated tape) will consume very little energy. As shown, the prisms are preferably movable in directions at right angles to the optical axis 14 of the focussing lens assembly 15 and each thereof is adjustable with reference to the respective holder so that it can be turned about an axis which is normal to the axis 14. The entire casing 38 occupies little room and may be rapidly and accurately adjusted and fixed in a selected position.

It is clear that the apparatus shown in FIG. 3 may be modified by constructing the deflecting means in such a way that, when the image of the transparency C is to be projected onto the surface of the film 16, only the prism 12 will remain in the position shown in FIG. 3. In other words, instead of shifting a selected prism into the path of the respective light ray, the apparatus may be constructed to shift all of the remaining prisms out of the paths of the other rays. An advantage of such modified apparatus is that the prism 12 will not vibrate during deflection of the light ray 8 because it need not move to but actually remains in operative position.

In the composing apparatus of FIG. 4, the stepped carrier 41 of FIG. 3 is replaced by a flat plate-like carrier 44, hereinafter called slide, which supports a single row of aligned inverted transparencies A–G. The light source 1 is partially surrounded by a modified deflector or shield 140 which carries two channel-shaped guide rails 45, 46 for the longitudinal edges of the slide 44. The prism 12 for the transparency C is shown in raised position so that the light ray 8 is deflected into the optical axis 14 and can reach the photosensitive surface of the film, not shown in FIG. 4. The mounting of the prisms 10–13 and of the prisms for the transparencies E, F, G is the same as shown in FIGS. 2 and 3.

The slide 44 may consist of organic or inorganic vitreous material or any other suitable material which can support the transparencies A–G in such a way that sufficient light can pass through the corresponding transparencies to form a satisfactory image on the photosensitive film. This slide 44 may be readily inserted into or removed from the space between the guide rails 45, 46 and the apparatus is preferably furnished with a large number of such slides which may carry transparencies representing letters, numerals, pictures or other intelligence.

The transparencies A–G on the slide 44 are optically corrected with reference to each other. The definition "optically corrected" is intended to denote that the transparencies A–G consist of diapositives or dianegatives which are obtained, for example, by backward projection from a first common plane into a second plane which is inclined with reference to the first plane through an angle corresponding to the forward projection angle. A very important advantage of the slide 44 is that it may be mounted in and shifted with reference to an extremely simple supporting structure, such as the guide rails 45, 46 of FIG. 4. The slide 44 is movable in a plane which is normal to the paths of light rays 6–9 and 9a–9c.

The connection between the rails 45, 46 and the shield 140 is sufficiently rigid to avoid vibration of a properly inserted slide. The same holds true for the casing 38 and its guide members 25 which present vibratory movements of the prisms.

FIG. 5 shows a composing apparatus wherein the shield 240 for the light source 1 is surrounded by several sets of pairwise arranged guide rails 245–246, 245a–246a, 245b, 246b, etc. These sets of rails respectively accommodate carriers or slides 244, 244a, 244b, etc. each of which may be inserted into and readily removed from the space between the respective pair of rails. The rails 245–246b, etc. form part of an elongated drum 47 of polygonal cross-sectional outline which may be rotated about the axis of the light source 1 by a drive here shown as including a pulley 48 and an endless belt 49, the belt being driven by a reversible motor (preferably through a variable-speed transmission, not shown) so that the drum 47 may rotate in a clockwise or counterclockwise direction (see the arrow 47a).

In the embodiment of FIG. 5, the slides 244, 244a, 244b respectively carry transparencies A–G of different size. However, it is clear that each of these slides may support a row of widely different transparencies, not only as regards their size but also as regards their meaning. Each slide is readily removable and each thereof may be inserted only at a time when the corresponding pair of guide rails has been moved to the position corresponding to that of the rails 245, 246.

Referring finally to FIG. 6, there is shown a composing apparatus wherein the rotary drum 47 of FIG. 5 is replaced by a fixed vertical board 50 supporting a series of superimposed, parallel, coplanar carriers or slides 344, 344a, 344b, etc. which are inserted into guide rails 345–346, 345a–346a, 345b–346b, etc. The end portions of these rails are slidably guided by the upright columns of the board 50 so that the operator may move any selected slide in front of a fixed light source 1 which is partially surrounded by a shield 340 serving to direct light rays against that slide which is moved into the space between the light source 1 and the casing 38. In FIG. 6, the prism 12 is shown in raised position so that the light ray 8 which passes through the transparency C on the slide 344 is deflected into the optical axis 14.

The guide rails 345–346b may be shifted up or down by a drive mechanism (not shown) which may include two endless chains mounted in the upright members of the board 50.

The images of various transparencies need not be projected directly from the respective deflecting element and onto a photosensitive surface. Thus, the composing apparatus may comprise an additional prism which is mounted on a carriage and can move in the longitudinal direction of a line of images on such surface. The surface of the film is then parallel to the optical axis. An advantage of such modified construction is that the film must be shifted only upon completion of a full line. The additional prism can be considered as a part of the focussing means.

Perforated tape for use in the composing apparatus of my present invention may be produced in a manner as disclosed, for example, in U.S. Patents Nos. 2,848,049 to Robbins et al., 3,056,545 to Donahue et al., and 3,083,897 to Vierling et al.

Reference may further be had to German-language publications entitled "Lino-Quick Perforator" and "Lino Film" distributed by Linotype GmbH, of Berlin and Frankfurt am Main, Germany. These publications describe and show keyboards and perforated tape of the type which may be used in the apparatus of my invention.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claim.

What is claimed as new and desired to be protected by Letters Patent is:

1. In a photographic composing apparatus, a carrier supporting a single row of transparencies; an elongated light source located behind said carrier so that light rays issuing from said source project the images of such transparencies in predetermined paths located in a common plane; a rotary drum surrounding said light source and comprising a plurality of pairwise arranged guide members parallel with said source, said carrier being received between and being movable longitudinally of one pair of such guide members; an intelligence storing body having an image-receiving surface; a lens assembly for focussing onto said surface one image at a time; and individual optical deflecting means, one for each of said transparencies, for selectively deflecting light rays passing through the associated transparencies from the respective paths and into the optical axis of said lens assembly, the length of each deflected light ray between the respective transparency and said surface being the same and said optical axis being inclined with reference to the longitudinal direction of said light source.

References Cited

UNITED STATES PATENTS

| 602,439 | 4/1898 | Friese-Greene | 95—4.5 |
| 2,946,268 | 7/1960 | Moyroud | 95—4.5 |
| 2,963,947 | 12/1960 | Freer | 95—4.5 |
| 3,204,539 | 9/1965 | Plooij | 95—4.5 |
| 3,218,945 | 11/1965 | O'Brien | 95—4.5 |

FOREIGN PATENTS 1,057,446 10/1953 France.

JOHN M. HORAN, *Primary Examiner.*